Dec. 17, 1968 H. G. EKRUT 3,416,164

PORTABLE WASTE DISPOSAL UNIT

Filed June 23, 1967 2 Sheets-Sheet 1

INVENTOR.
HANS G. EKRUT
BY Burd, MacEachron, Braddock,
Bartz & Schwartz
ATTORNEYS Dec. 17, 1968   H. G. EKRUT   3,416,164
PORTABLE WASTE DISPOSAL UNIT
Filed June 23, 1967   2 Sheets-Sheet 2

INVENTOR.
HANS G. EKRUT
BY
Burd, MacEachron, Braddock,
Bartz & Schwartz
ATTORNEYS

United States Patent Office 3,416,164
Patented Dec. 17, 1968

3,416,164
PORTABLE WASTE DISPOSAL UNIT
Hans G. Ekrut, 7939 Zane Ave., Brooklyn Park, Minn.
Continuation-in-part of application Ser. No. 541,313,
Apr. 8, 1966. This application June 23, 1967, Ser. No.
648,263
10 Claims. (Cl. 4—142)

ABSTRACT OF THE DISCLOSURE

A unit for packaging human wastes for disposal for use where access to sanitary sewer facilities is not available. The unit includes a frame for supporting a waste receiving bag in open mouth position for deposit of wastes. The interior edges of the bag in the area of the mouth are pressure sensitive. The unit also includes a pair of pressure bars, at least one of which is movable, which are brought together to squeeze the top pressure sensitive edges of the waste containing bag to seal the bag for dry sanitary disposal.

---

This application is a continuation-in-part of my copending application Ser. No. 541,313 filed Apr. 8, 1966 for Waste Disposal Unit.

This invention relates to a sanitary waste disposal unit for use where ready access and connection to established sewer lines and other waste disposal facilities is not possible. More particularly, this invention relates to a sanitary disposal unit for human wastes for use in vehicles such as buses, airplanes, trailers, campers, boats and the like.

Increasing antipollution legislation and regulations at all levels of government is forcing re-evaluation of existing waste disposal and pollution control devices. There are now three principal types of such devices in use: (1) those that grind and chemically treat sewage with a disinfectant, such as chlorine; (2) holding tanks that are emptied into disposal facilities at camp sites, dockside, deep water away from shore, and the like; and (3) incinerators that reduce waste to ash. Each of these has major drawbacks such as relatively high cost, complex mechanism susceptible to malfunction, difficulty of maintenance and repair when away from urban areas, complicated installation, difficult off-season maintenance, danger of fire, and the like.

It is the principal object of the present invention to provide a sanitary waste disposal unit which is relatively simple in construction, relatively inexpensive, yet effective and aesthetically acceptable, easy and simple to operate, easy to install and maintain, and possesses other advantages which will become apparent as the description proceeds.

The invention is illustrated by the accompanying drawings in which corresponding parts are identified by the same numerals and in which.

Figure 1:
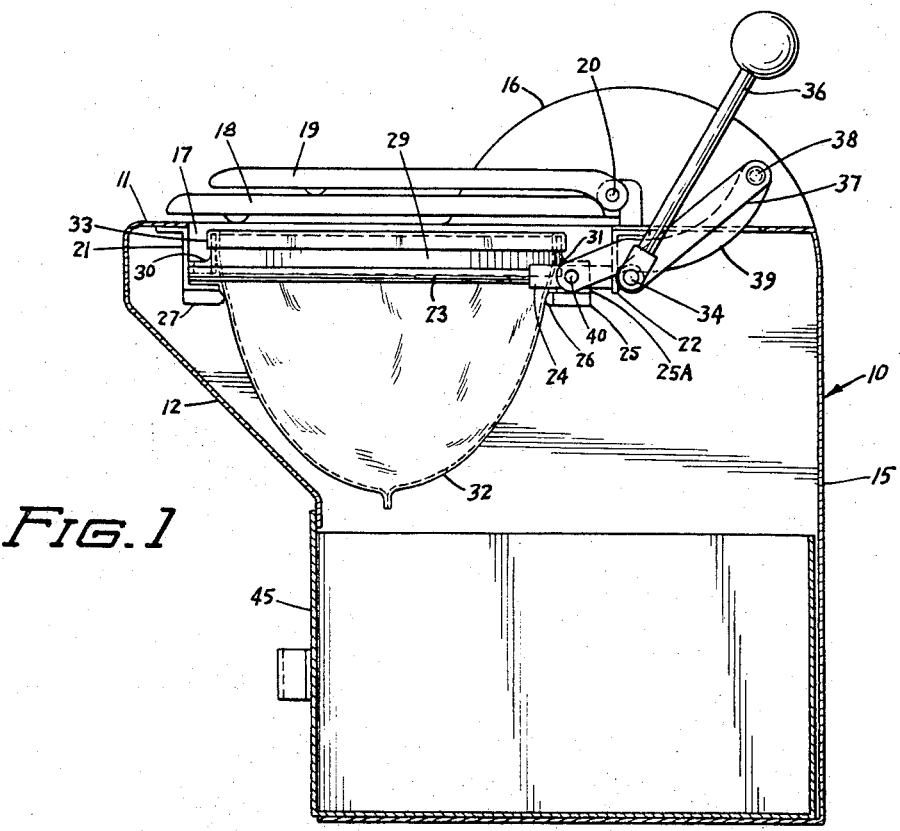
FIGURE 1 is a side elevation with the left side wall and other parts broken away to show interior construction of the waste disposal unit according to the present invention and showing the parts in "open" position.

Broadly stated, the sanitary disposal unit according to the present invention comprises a device for suspending an open mouthed waste receiving bag of flexible sheet of film material which, after receipt of waste, is pressure sealed. The inside edges of the bag adjacent the open mouth are pressure sensitive. The sealing is accomplished by compressing the open-mouth end of the bag between a pair of pressure bars. Thereafter, the sealed bag of waste is maintained in storage until several such bags have been accumulated for disposal.

Referring now to the drawings, the waste disposal unit according to the present invention is shown as a toilet for disposal of human wastes enclosed in a housing indicated generally at 10. The housing 10 has a top wall 11, front 12, sides 13 and 14 and rear 15. Desirably the front 12 and sides 13 and 14 taper inwardly to a narrower pedestal base. The top 11 includes a pair of upwardly projecting spaced apart flat semicircular bubble-like enclosures 16 adjacent the rear wall 15. The top 11 also includes a central opening 17 over which are positioned an annular toilet seat 18 and lid 19 both hinged at 20 in the usual manner. Housing 10 is desirably molded in one piece from fiber glass reinforced epoxy resin, acrylonitrile - butadiene - styrene (ABS) or the like.

An elongated horizontal Z-profile bracket 21 is supported from the bottom surface of top 11 across the inside front of the housing. A parallel elongated horizontal inverted L-profile bracket 22 is supported from the bottom surface of top 11 spaced from front bracket 21 on the opposite side of opening 17. A pair of spaced apart guide members 23 in the form of rails or tracks extend between the front and rear brackets 21 and 22 spaced apart on opposite sides of the housing. Guide members 23 may be secured by any conventional means, such as welding. A guide engaging member 24, here shown in the form of a sleeve, engages each of the guide members 23.

An elongated rigid horizontal compression bar 25 is supported by a further angle bracket 25A to which the guide engaging members 24 are secured for movement of the assembly along the guide members 23. Bar 25 may optionally be provided with a resilient cushion 26. A companion elongated horizontal stationary compression bar 27 is supported by front bracket 21. Stationary bar 27 is mounted in horizontal alignment with and parallel to movable compression bar 25.

A bag or pouch supporting carriage ring 29 is mounted below the inside surface of housing top 11 immediately below opening 17. The carrier ring is desirably of a size intermediate between the size of the opening in toilet seat 18 and opening 17 in the top of the housing. Carrier ring 29 is supported on its opposite sides, at its front and back edges, by a bracket 30 secured to front bracket 21 and a bracket 31 secured to the angle bracket 25A carrying the movable compression bar 25.

Carrier ring 29 is flat in cross-section and vertically extending. Brackets 30 and 31 are attached to the bottom edge of the carrier ring 29 so as to leave a free standing upper rim. This permits the top edge of the open end of a pouch or bag 32 to be folded over the top rim of ring 29 so as to suspend the bag within the ring in open position to receive refuse. The bag or pouch 32 may be provided with a thickened or reinforced edge 33 to engage the rim of ring 29. Alternatively, the outer lips of bag 32 may be pressure sensitive for ready adhesion to the inner surface of the carrier ring. Carrier ring 29 is formed from flexible material, such as stainless steel strap (which may be hinged at its sides midway between the supporting brackets) or polypropylene, so that it may be collapsed into an elongated loop as movable compression bar 25 is advanced into contact with stationary compression bar 27 to close and seal the bag 32.

The means for actuating closing and sealing of the bag 32 is as follows: A shaft 34 is journalled in a sleeve 35 carried by the rear bracket 22. One end of shaft 34 extends beyond the limits of housing 10 and has an operating handle 36 secured thereto for rotating the shaft. A pair of parallel arms or levers 37 are fixed to shaft 34 for rotation therewith adjacent the opposite ends of the shaft and positioned within the hollow projections 16 of the housing top. As shown in FIGURE 1, arms 37 extend upwardly and rearwardly from the shaft in their normal at rest position at an angle of about 45° from horizontal. By comparison with FIGURE 2 it will be seen that the shaft 34, handle 36 and arms 37 rotate through an arc of about 140°.

The end of each fixed arm 37 is pivotally connected at 38 to one end of a link 39, the opposite end of which is pivotally connected to the angle bracket 25A carrying the movable compression bar 25. The bottom edge of link 39 rests against shaft 34 to provide a stop for the movable compression bar 25 and its associated carrier structure.

Figure 2:
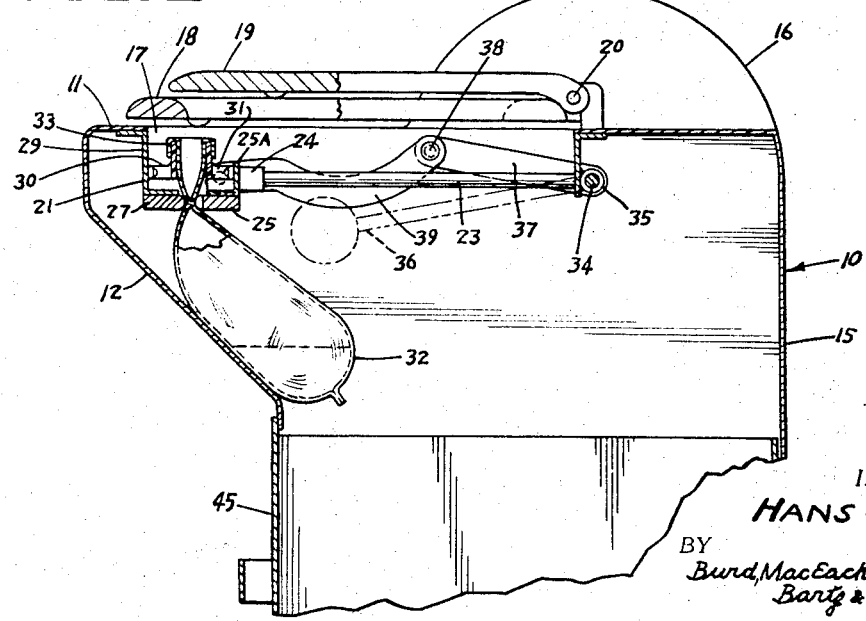
FIGURE 2 is a side elevation in section, along the line 2—2 of FIGURE 3 and in the direction of the arrows, showing the parts in "closed" position.
Figure 3:
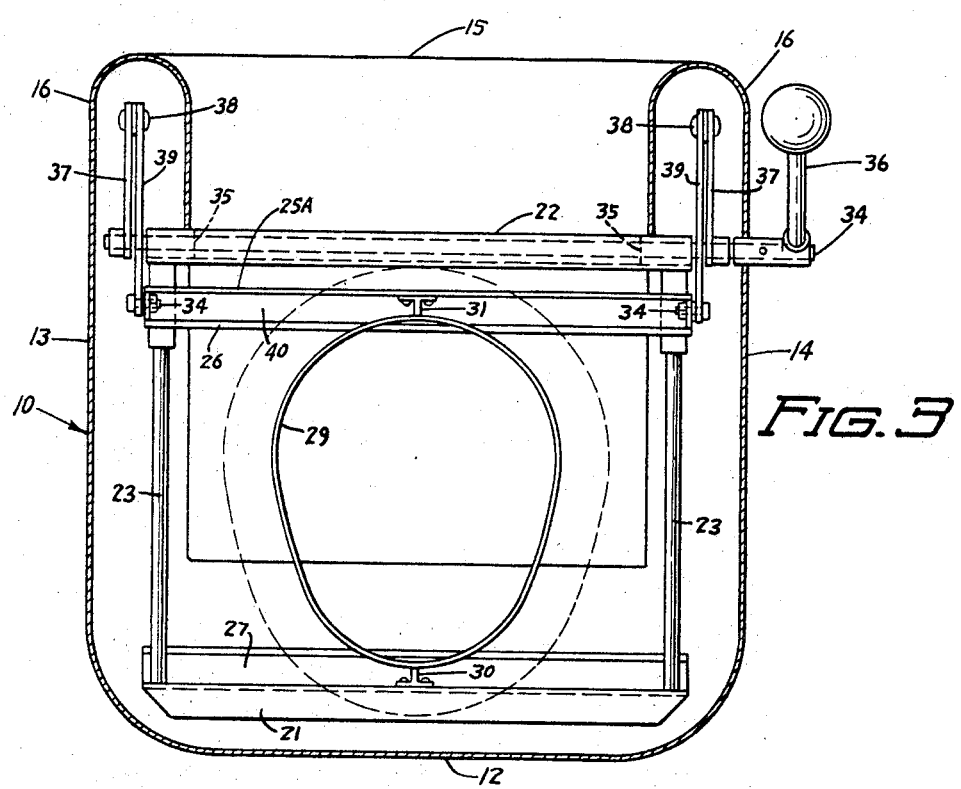
FIGURE 3 is a plan view with the top removed to show interior construction.
Figure 4:
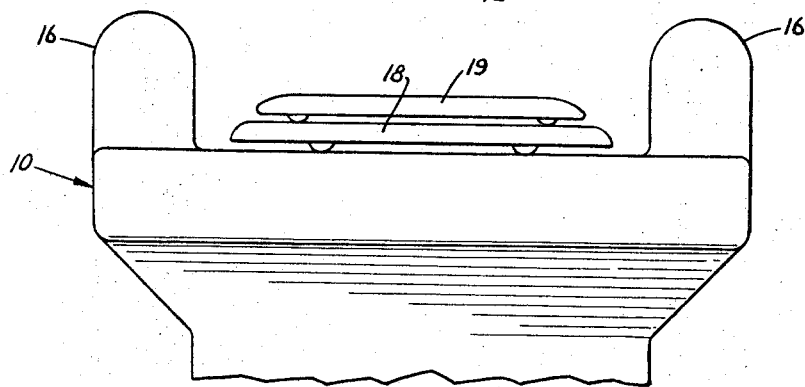
FIGURE 4 is a front elevation.
Figure 5:
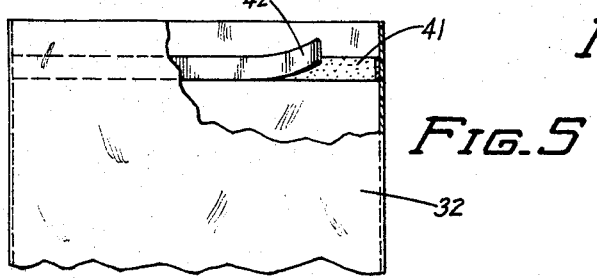
FIGURE 5 is a fragmentary elevation, partly broken away, of a pressure sensitive bag which may be used with the unit according to the present invention.

By comparison of FIGURES 1 and 2, it will be seen that, as handle 36 is pulled forward, shaft 34 is rotated to rotate fixed arms 37 forwardly and to transmit forward motion through links 39 to the carrier structure for movable compression bar 25. This causes the bag carrier ring 29 to gradually collapse into a flat loop, bringing the inside opposite pressure sensitive faces of bag 32 together between the opposed edges of the compression bars 25 and 27.

As handle 36 is moved past dead-center the top edge of the bag 32 is maintained compressed between the edges of stationary bar 27 and movable bar 25. This position need be maintained only for an instant to effect a tight dry seal between the pressure sensitive surfaces of the bag 32.

The handle is then lifted to retract the movable compression bar. The weight of the sealed bag and the fact that the top edges of the bag are sealed together causes the bag of waste to be eased free from the carrier ring as it opens and the bag is dropped by gravity into the storage compartment at the bottom of the housing. Another bag is then placed on the bag carrier ring and the unit is ready for reuse.

The waste storage compartment is desirably in the form of a drawer which can be removed to dispose of the accumulated sealed pouches of waste as required by the frequency of use. Desirably drawer 45 may be fitted with a lined or unlined corrugated cardboard carton which may be installed in the drawer with flaps open. Disposal is then made simple and easy by merely closing the flaps of that carton. This may then be incinerated or buried or the like.

The bag or pouch 32 is formed from any thin flexible impermeable film or sheet material, such as polyethylene, polyvinyl chloride, Saran or the like, or paper coated to render it water impermeable. For aesthetic reasons, it is desirably opaque. It should be of sufficient thickness to give the sealed bag strength for handling and disposal without rupture. The inside lip of the bag or pouch 32 is made pressure sensitive. Depending upon the particular resinous material of which the bags or pouches 32 are made, the inside surfaces may be made tacky and pressure sensitive by the application of a solubilizing substance in the area of the open mouth. Preferably the bags are made pressure sensitive by the application of a thin layer of a pressure sensitive adhesive in the form of a stripe 41.

The adhesive stripe 41 is desirably spaced inward from the open end of the bag 32 and is of a sufficient width to insure the establishment of a sealing bond when opposite sides of the bag are pressed together, even if the bag has been carelessly placed on carrier ring 29. Numerous pressure sensitive adhesive materials are available commercially and may be used in the manufacture of waste receiving bags for use with the sealing unit of the present invention. Depending upon the degree of tackiness of the adhesive, it may be necessary to overlay a strippable tape 42 on the stripe of adhesive 41 to prevent premature sticking of opposed bag surfaces. In this instance tape 42 may be stripped off after the bag is suspended from the carrier ring and may be dropped in the bag for disposal with other wastes. Other less-tacky adhesives, which do not adhere to one another except upon application of considerable pressure, do not require the use of means to prevent premature adhesion.

Bags 32 may be of the gusseted type or not, as desired. While the sealing faces of compression members 25 and 27 are shown as relatively narrow, they may desirably be broad and flat. Precise alignment of the adhesive stripe with the compression members becomes less critical as the widths of the sealing faces and adhesive stripe increase.

For aesthetic reasons, and to insure a tight seal, it is desirable to provide an annular shield depending from the opening of seat 18 into the top of the open-mouthed bag 32. This shield desirably extends a distance to just below the point of sealing of the bag. This avoids soiling of the inside surfaces of the upper end of the bag with urine or excrement which, being outside of the seal line, might otherwise create an odor problem. The annular shield is desirably formed as part of seat 18. This means, of course, that the seat must be lifted or mechanically raised into the open position during the period of sealing. Alternatively, the shield may be formed from thin flexible disposable film which is fitted to seat 18 and which is dropped into bag 32 after use of the toilet and discarded with the other waste.

For double assurance that the waste bag 32 will be sealed after use the compression bars 25 and 27 may be duplicated by a companion pair of bars spaced vertically from the first pair. In this manner a double seal composed of a pair of parallel seal lines is formed. In the event of failure of one seal, the other is effective to insure against leakage of the bag contents.

While one form of manually operated mechanical means has been shown for moving the compression bars 25 and 27 together, it will be apparent that other functionally equivalent means may be used. These may be either manually operated or automatic. Either hydraulic or pneumatic pistons may be used to move the movable compression member, or either a hand operated or electrical screw may be used for that purpose.

In the event of an emergency situation caused by depletion of the stock of bags 32 or the like, any available receptacle may be placed in the storage compartment to permit use of the toilet. Even the drawer 45 may be used for this purpose.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A sanitary waste disposal unit comprising in combination:
 (A) a housing,
 (B) suspension means adjacent the top of said housing for suspending in open-mouth position an impermeable pressure-sealable waste-receiving bag of flexible film material,
 (C) spaced apart compression means within said housing adjacent the top thereof and adjacent said suspension means, said suspension and compression means being movable together for squeezing together the sides of said bag adjacent the open end thereof while still suspended from said suspension means,
 (D) a sanitary waste disposal bag hanging from said suspension means and comprising:
  (i) a flexible water impermeable bag open at the top and closed at its sides and bottom;
  (ii) a horizontal stripe of pressure sensitive material on the inside surface of the bag adjacent the open top end thereof;
  (iii) said stripe extending around at least half of the perimeter of the bag, whereby when the top of the bag is pressed together a tight top closure seal is formed.

(E) means for moving said suspension means and said compression means together for sealing the top squeezed-together end of said bag in the area of said pressure sensitive material, and (F) storage means disposed within said housing below said suspending and compression sealing means for receiving sealed bags of waste by gravity.

2. A sanitary waste disposal unit according to claim 1 adapted for disposal of human wastes further characterized in that:

(A) said housing is generally enclosed, (B) the top of said housing has a generally circular opening therein, (C) an annular toilet seat is hinged to said housing and covers said opening, and (D) a hinged cover is disposed over said toilet seat.

3. A sanitary waste disposal unit according to claim 1 further characterized in that:

(A) said means for suspending a plastic bag comprises:
(1) an annular ring supported by its bottom edge,
(2) said ring having a free standing upper rim adapted to support a plastic bag by having the edges of the open end of the bag folded over the rim.

4. A sanitary waste disposal unit according to claim 1 further characterized in that:

(A) said means for suspending a plastic bag comprises:
(1) an annular flexible ring,
(2) said ring being supported by its bottom edge on its opposite sides,
(3) said ring being supported by said compression means above the squeezing area of said compression means,
(4) said ring having a free standing upper rim adapted to support a plastic bag by having the edges of the open end of the bag folded over the rim,
(5) said ring being collapsible into a narrow elongated loop upon movement of its supports with said compression means.

5. A sanitary waste disposal unit according to claim 1 further characterized in that:

(A) said compression means comprises:
(1) a pair of rigid elongated bar members,
(2) said bar members being spaced apart sufficient to embrace an open-mouthed plastic bag suspended from the top of the housing, and
(3) at least one of said bar members being movable relative to the other.

6. A sanitary waste disposal unit according to claim 1 further characterized in that:

(A) said compression means comprises:
(1) a pair of rigid parallel elongated horizontal bar members,
(2) said bar members being spaced apart sufficient to embrace an open-mouthed plastic bag suspended from the top of the housing,
(3) one of said bar members being stationary, and
(4) the other of said bar members being movable.

7. A sanitary waste disposal unit according to claim 6 further characterized in that:

(A) said moving means includes:
(1) a pair of parallel spaced apart horizontal guide members extending between said rigid compression bar members adjacent the ends thereof,
(2) a pair of guide engaging members on said movable compression bar member adjacent the ends thereof to support said movable compression bar member and guide the same in its movement toward said stationary bar member,
(3) a shaft journalled to rotate on an axis parallel to said movable compression bar member,
(4) handle means secured to rotate said shaft,
(5) at least one lever arm secured to rotate with said shaft, and
(6) a link pivotally connected at one end to said lever arm and pivotally connected at the other end to said movable compression bar member, whereby upon movement of said handle means said movable compression bar member is moved along said guide members into resilient contact with said stationary compression bar member.

8. A sanitary waste disposal unit according to claim 1 adapted for disposal of human wastes further characterized in that:

(A) said housing is generally enclosed with a top having a generally circular opening therein, an annular toilet seat hinged to the top covering said opening and a lid over said seat, (B) said means for supporting a plastic bag comprises an annular flexible ring supported by its bottom edge on its opposite sides by said compression means above the squeezing area of said compression means, having a free standing upper rim adapted to support a plastic bag by having the edges of the open end of the bag folded over the rim and being collapsible into a narrow elongated loop upon movement of its supports with said compression means, and (C) said compression means comprises a pair of rigid parallel elongated horizontal bar members spaced apart on opposite sides of said bag supporting means.

9. A sanitary waste disposal unit according to claim 8 further characterized in that:

(A) said means for moving said compression bars together comprises:
(1) a pair of parallel spaced apart guide members extending between said spaced apart compression bar members adjacent the ends thereof,
(2) a pair of guide engaging members on one of said compression bar members adjacent the ends thereof to guide the same in movement along said guide members,
(3) a shaft journalled to rotate on an axis parallel to said guided compression bar member,
(4) handle means secured to said shaft,
(5) at least one lever arm secured to rotate with said shaft, and
(6) a link pivotally connected at one end to said lever arm and pivotally connected at the other end to said guided compression bar member whereby upon movement of said handle means said guided compression bar member is moved along said guide members into contact with the other of said bar members.

10. A sanitary waste disposal unit according to claim 1 further characterized in that said sanitary waste disposal bag is formed from synthetic resinous film and is opaque; said stripe of pressure sensitive material is substantially parallel to and spaced inwardly from the top edge of the bag to provide a non-sensitive supporting lip by which the bag may be suspended in open-mouthed position for use.

References Cited

UNITED STATES PATENTS

| 479,897 | 8/1892 | Murphy | 4—111 |
| 1,764,149 | 6/1930 | Cadwellader | 4—142 |
| 2,671,906 | 3/1954 | Potts | 4—131 |
| 2,794,989 | 6/1957 | Pellerito et al. | 4—111 |
| 2,801,426 | 8/1957 | Gorce et al. | 4—142 |

LAVERNE D. GEIGER, Primary Examiner.

H. K. ARTIS, Assistant Examiner.

U.S. Cl. X.R.

4—135